(12) United States Patent
Imada (10) Patent No.: US 10,576,406 B2
(45) Date of Patent: Mar. 3, 2020

(54) EXHAUST PURIFICATION DEVICE, INTERNAL COMBUSTION DEVICE, AND POWER GENERATION DEVICE

(71) Applicant: FUJITSU LIMITED, Kawasaki-shi, Kanagawa (JP)

(72) Inventor: Tadahiro Imada, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/939,611

(22) Filed: Mar. 29, 2018

(65) Prior Publication Data

US 2018/0280856 A1    Oct. 4, 2018

(30) Foreign Application Priority Data

Apr. 4, 2017  (JP) .................. 2017-074669

(51) Int. Cl.
| | |
|---|---|
| *B01D 46/00* | (2006.01) |
| *F01N 3/035* | (2006.01) |
| *F01N 13/00* | (2010.01) |
| *B01D 53/94* | (2006.01) |
| *F01N 3/028* | (2006.01) |
| *F01N 13/16* | (2010.01) |
| *F01N 3/021* | (2006.01) |

(Continued)

(52) U.S. Cl.
CPC ....... *B01D 46/0061* (2013.01); *B01D 53/944* (2013.01); *B01D 53/9431* (2013.01); *B01D 53/9495* (2013.01); *F01N 3/021* (2013.01); *F01N 3/028* (2013.01); *F01N 3/035* (2013.01); *F01N 3/103* (2013.01); *F01N 3/202* (2013.01); *F01N 13/0097* (2014.06); *F01N 13/16* (2013.01); *B01D 46/0063* (2013.01); *B01D 2255/30* (2013.01); *B01D 2259/806* (2013.01); *B01D 2273/22* (2013.01); *B01D 2279/30* (2013.01); *F01N 2240/05* (2013.01); *F01N 2250/02* (2013.01)

(58) Field of Classification Search
CPC ......... F01N 3/202; F01N 3/021; F01N 3/035; F01N 2250/02; B01D 46/0061
USPC ........................ 422/168, 171, 176; 216/69
See application file for complete search history.

(56) References Cited

U.S. PATENT DOCUMENTS

| | | | | |
|---|---|---|---|---|
| 5,087,272 | A | * | 2/1992 | Nixdorf ............. B01D 46/0012 55/466 |
| 5,150,573 | A | * | 9/1992 | Maus .................... F01N 3/281 422/171 |

(Continued)

FOREIGN PATENT DOCUMENTS

| | | |
|---|---|---|
| EP | 1336730 | 8/2003 |
| JP | 5-222924 | 8/1993 |

(Continued)

*Primary Examiner* — Tom P Duong
(74) *Attorney, Agent, or Firm* — Fujitsu Patent Center (57) ABSTRACT

There is provided an exhaust purification device including a particulate filter configured to collect particulates contained in an exhaust gas, an oxidation catalyst disposed in a front stage of the particulate filter and configured to have a carrier partially or entirely made of a material which absorbs a microwave, a housing in which the particulate filter and the oxidation catalyst are arranged, and a microwave generator configured to generate a microwave to be irradiated onto the oxidation catalyst in a direction to which the exhaust gas flows.

13 Claims, 12 Drawing Sheets

(51) Int. Cl.
*F01N 3/10* (2006.01)
*F01N 3/20* (2006.01)

(56) References Cited

U.S. PATENT DOCUMENTS

| | | | |
|---|---|---|---|
| 7,531,143 B2* | 5/2009 | Bruggendick | B01D 45/08 422/176 |
| 8,425,850 B1* | 4/2013 | Lin | B01D 46/10 422/176 |
| 2009/0118121 A1* | 5/2009 | Sarai | B01D 46/0024 502/439 |
| 2009/0217818 A1* | 9/2009 | Gonze | F01N 3/028 95/278 |
| 2014/0151334 A1* | 6/2014 | Matsumoto | B82Y 40/00 216/69 |
| 2015/0004063 A1* | 1/2015 | Lee | A61L 9/16 422/121 |
| 2015/0197853 A1* | 7/2015 | Ishibashi | C23C 16/4584 118/723 R |

FOREIGN PATENT DOCUMENTS

| | | |
|---|---|---|
| JP | 2001-098936 | 4/2001 |
| JP | 2003-239725 | 8/2003 |
| JP | 2006-140063 | 6/2006 |
| JP | 2014015909 A * | 1/2014 |

* cited by examiner

EXHAUST PURIFICATION DEVICE, INTERNAL COMBUSTION DEVICE, AND POWER GENERATION DEVICE

CROSS-REFERENCE TO RELATED APPLICATION

This application is based upon and claims the benefit of priority of the prior Japanese Patent Application No. 2017-074669, filed on Apr. 4, 2017, the entire contents of which are incorporated herein by reference.

FIELD

The embodiments discussed herein are related to an exhaust purification device, an internal combustion device, and a power generation device.

BACKGROUND

An exhaust purification device using a diesel particulate filter (DPF) has been practically used as a device for collecting particulates such as particulate matter (PM) contained in an exhaust gas. In this exhaust purification device, since particulates such as the PM are deposited on the DPF as the device is used, it is required to regenerate the DPF. As a method of regenerating the DPF, there has been disclosed a method using a high frequency electromagnetic wave such as a microwave emitted from a microwave irradiation device (e.g., Japanese Laid-Open Patent Publication No. 2006-140063). Specifically, this method regenerates the DPF by irradiating an electromagnetic wave such as a microwave to the DPF so as to heat and burn the particulates such as the PM deposited on the DPF.

Related techniques are disclosed in, for example, Japanese Laid-Open Patent Publication Nos. 2006-140063, 2001-098936, 2003-239725, and 05-222924.

SUMMARY

According to an aspect of the invention, an exhaust purification device includes a particulate filter configured to collect particulates contained in an exhaust gas, an oxidation catalyst disposed in a front stage of the particulate filter and configured to have a carrier partially or entirely made of a material which absorbs a microwave, a housing in which the particulate filter and the oxidation catalyst are arranged, and a microwave generator configured to generate a microwave to be irradiated onto the oxidation catalyst in a direction to which the exhaust gas flows.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As a method of regenerating a DPF, there is a method of installing a diesel oxidation catalyst (DOC) formed by an oxidation catalyst in the front stage of a DPF into which an exhaust gas flows, generating nitrogen dioxide ($NO_2$) with the DOC, and using the $NO_2$ to remove particulates such as PM deposited in the DPF. However, in recent years, for example, the efficiency of an engine has been improved, and the temperature of an exhaust gas tends to be lowered. Since the DOC is not activated as a catalyst unless the temperature of the DOC reaches a certain level or higher, the function of the DOC may not be sufficiently achieved when, for example, the efficiency of an engine is improved and the temperature of an exhaust gas is low.

Therefore, there has been a demand for a technique capable of sufficiently achieving the function of the DOC even when, for example, the efficiency of an engine the like is improved and the temperature of an exhaust gas becomes low.

Embodiments for carrying out this technique will be described below. For example, corresponding members will be denoted by the same reference numeral, and overlapping descriptions thereof will be omitted.

First Embodiment

[Exhaust Purification Device]

Figure 1:
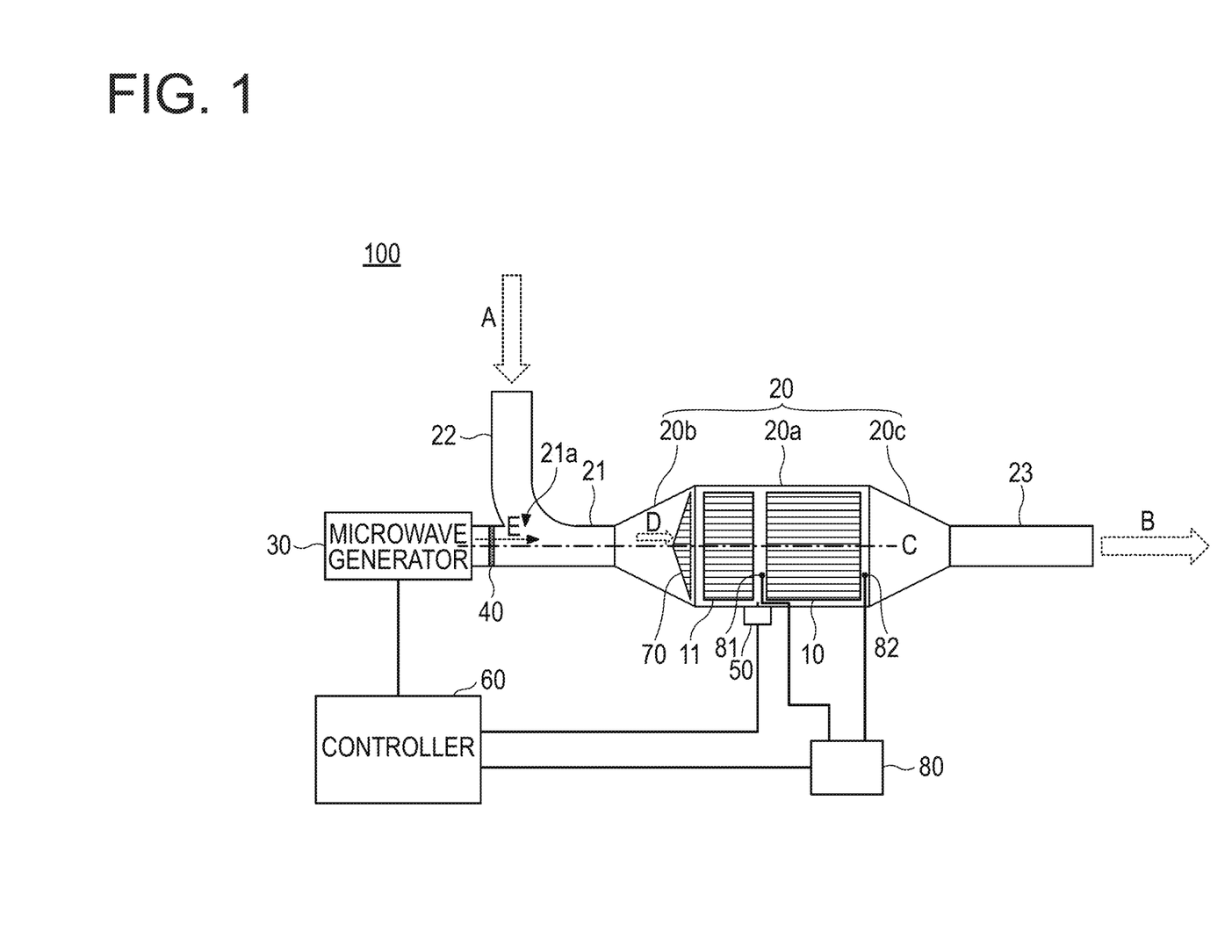
FIG. 1 is a structural view of an exhaust purification device according to a first embodiment.

An exhaust purification device 100 according to a first embodiment will be described with reference to FIG. 1.

The exhaust purification device 100 according to the present embodiment includes, for example, a particulate filter 10, an oxidation catalyst 11, a housing 20, a microwave generator 30, a thermometer 50, a controller 60.

The particulate filter 10 is formed by, for example, a DPF. For example, the DPF is formed by a honeycomb structure in which adjacent vents are alternately closed, and an exhaust gas is discharged from vents different from vents at the entrance.

Figure 2A:
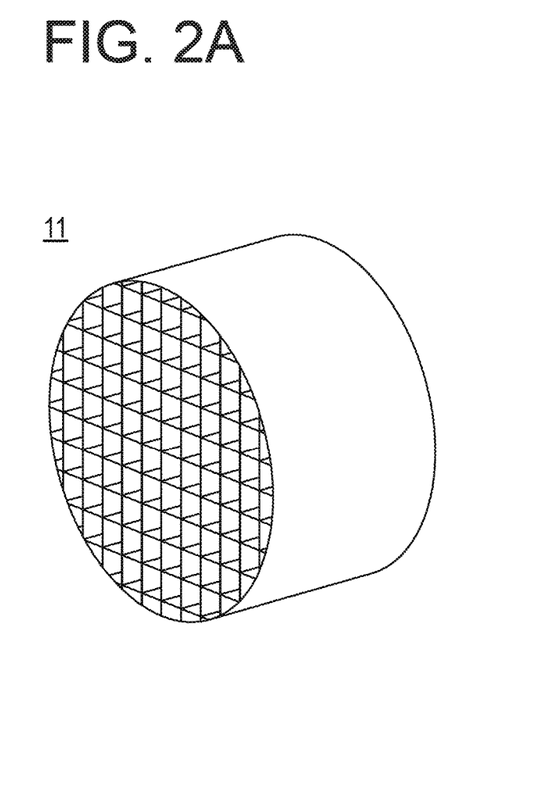
FIGS. 2A and 2B are explanatory views of the structure of a DOC.
Figure 2B:
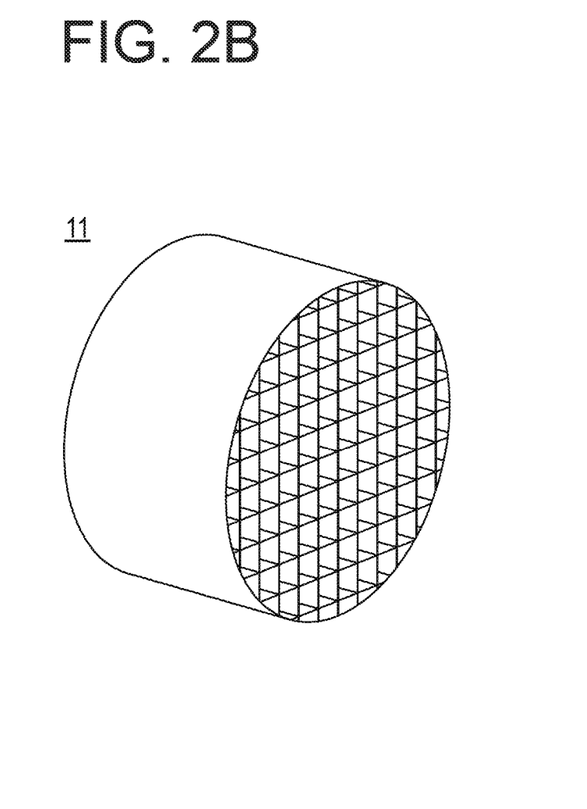

The oxidation catalyst 11 is formed by an oxidation catalyst such as a DOC. As illustrated in FIGS. 2A and 2B, the DOC forming the oxidation catalyst 11 has a structure in which an oxidation catalyst is formed on the surface of a honeycomb-shaped carrier and no plugging is installed in the opening portion of the honeycomb-shaped carrier. FIG. 2A is a perspective view of the DOC forming the oxidation catalyst 11 when viewed from the intake side and FIG. 2B is a perspective view of the DOC when viewed from the exhaust side.

In general, the carrier of the oxidation catalyst 11 is formed by, for example, cordierite, but in the present embodiment, the carrier of the oxidation catalyst 11 is formed of a material that absorbs a microwave, such as SiC (silicon carbide). Since the oxidation catalyst in the DOC does not sufficiently exhibit its function as a catalyst when the temperature is low, it is necessary to heat the oxidation catalyst to a certain temperature in order to activate the oxidation catalyst as a catalyst. In the related art, for example, the temperature of an exhaust gas from an engine is high, and the oxidation catalyst of the DOC is heated by, for example, the exhaust gas to a temperature at which the oxidation catalyst is activated. However, with recent technical development, the efficiency of the engine is improved, and for example, the temperature of the exhaust gas tends to decrease, so that the oxidation catalyst of the DOC may not be heated by, for example, the exhaust gas to a temperature at which the oxidation catalyst is activated.

In the exhaust purification device of the present embodiment, by irradiating a microwave generated in the microwave generator 30 to the oxidation catalyst 11, the oxidation catalyst in the oxidation catalyst 11 may be heated to a temperature at which the oxidation catalyst is activated, for example, 250° C. to 300° C. Therefore, the carrier of the oxidation catalyst 11 is formed of, for example, SiC which is a material that absorbs the microwave. An example of the material that absorbs the microwave may include foamed metal such as a foamed Ni-based material which is sponge-like metal, in addition to SiC. A portion of the carrier of the oxidation catalyst 11 may be made of the material that absorbs the microwave. However, in order to efficiently heat the oxidation catalyst of the oxidation catalyst 11, the carrier of the oxidation catalyst 11 is entirely made of the material that absorbs the microwave.

The housing 20 is made of a metal material such as stainless steel and includes a housing body 20a covering the periphery of the oxidation catalyst 11 and the particulate filter 10, and an inlet port 20b and an outlet port 20c which are connected to the housing body 20a. One side of an inlet side connection pipe 21 is connected to the inlet port 20b, and the other side of the inlet side connection pipe 21 is connected to the microwave generator 30. Therefore, the inlet side connection pipe 21 is interposed between the inlet port 20b and the microwave generator 30. A suction pipe 22 is connected to the middle of the inlet side connection pipe 21, and an exhaust pipe 23 is connected to the outlet port 20c.

In the exhaust purification device according to the present embodiment, for example, an exhaust gas from an engine enters the suction pipe 22 in the direction indicated by the broken line arrow A, passes through the inlet side connection pipe 21, and flows from the inlet port 20b into the housing 20. The exhaust gas, for example, which has entered the housing 20 is purified while passing through the oxidation catalyst 11 and the particulate filter 10 installed in the housing body 20a and is exhausted from the exhaust pipe 23 via the outlet port 20c in the direction indicated by the broken line arrow B.

In the housing 20, the oxidation catalyst 11 and the particulate filter 10 are arranged in this order in the direction of the flow of the exhaust gas, that is, in the direction from the inlet port 20b toward the outlet port 20c. The oxidation catalyst 11 oxidizes a component contained in the exhaust gas entering from the inlet port 20b, which changes, for example, NO contained in the exhaust gas into $NO_2$ having a relatively stronger oxidizing power. In the particulate filter 10, particulates such as PM are collected, but the $NO_2$ generated in the oxidation catalyst 11 is used to burn and remove the collected particulates such as PM. The particulates such as PM collected in the particulate filter 10 are, for example, soot and contain a large amount of C (carbon). When burning and removing the particulates such as PM collected in the particulate filter 10, the $NO_2$ is caused to flow and chemically react with C so as to produce $CO_2$. As a result, the particulates such as PM collected in the particulate filter 10 may be efficiently removed.

The microwave generator 30 may generate an electromagnetic wave of 300 MHz to 3 GHz, for example, a microwave of 2.45 GHz. In the microwave generator 30, a semiconductor device formed of a nitride semiconductor is used in order to generate a high power microwave necessary for heating the oxidation catalyst 11.

In the present embodiment, the microwave generator 30 is installed at the upstream side of the oxidation catalyst 11 on the extension line of the direction of the flow of the exhaust gas in the oxidation catalyst 11 and the particulate filter 10. That is, the oxidation catalyst 11 is interposed between the microwave generator 30 and the particulate filter 10, and the microwave generator 30, the oxidation catalyst 11, and the particulate filter 10 are arranged to be aligned on the same line indicated by the dash-dot line 1C. Accordingly, the components are arranged such that the direction indicated by the broken line arrow D in which, for example, the exhaust gas flows in the housing 20 substantially matches the direction indicated by the broken line arrow E in which the microwave generated in the microwave generator 30 is emitted.

By disposing the microwave generator 30 at such a position, it is possible to uniformly irradiate the microwave to the oxidation catalyst 11 without any bias, thereby making it possible to uniformly heat the oxidation catalyst 11 without any bias. Further, in this structure, the microwave transmitted through the oxidation catalyst 11 is also irradiated to the particulate filter 10, which contributes to the removal of the particulates such as PM deposited in the particulate filter 10. Therefore, it is preferable that the carrier of the DPF forming the particulate filter 10 is also made of a material that absorbs the microwave, such as SiC.

In the present embodiment, for example, in order to prevent the exhaust gas from flowing into the microwave generator 30, a microwave transmission plate 40 is installed inside the inlet side connection pipe 21 interposed between the inlet port 20b and the microwave generator 30. When, for example, the exhaust gas flows into the side of the microwave generator 30, the microwave generator 30 may be damaged by, for example, the exhaust gas, which may cause, for example, a failure. In the present embodiment, the microwave transmission plate 40 is installed inside the inlet side connection pipe 21 between a connecting portion 21a of the inlet side connection pipe 21 to which the suction pipe 22 is connected and the microwave generator 30 so as to prevent the exhaust gas from flowing into the side of the microwave generator. The microwave transmission plate 40 is made of a material such as ceramics which is capable of blocking the inflow of, for example, the exhaust gas and transmitting the microwave. Specifically, the microwave transmission plate 40 is made of, for example, cordierite, alumina, titania, or zirconium oxide.

The thermometer 50 is attached to the housing 20 and measures the temperature of the particulate filter 10 or the oxidation catalyst 11 in the housing 20. The thermometer 50 may be, for example, a radiation thermometer or may be one capable of measuring a temperature distribution in the particulate filter 10 or the oxidation catalyst 11. The controller 60 controls the exhaust purification device in the present embodiment. Further, in the present embodiment, a particulate deposition amount measurement circuit 80 is installed to measure the amount of particulates such as PM deposited in the particulate filter 10. The particulate deposition amount measurement circuit 80 is connected to pressure sensors 81 and 82 installed in front of and behind the particulate filter 10 and measures the amount of particulates such as PM deposited in the particulate filter 10 based on a pressure difference between the pressure in the pressure sensor 81 and the pressure in the pressure sensor 82. When the amount of particulates such as PM deposited in the particulate filter 10 is large, the pressure difference between the pressure sensor 81 and the pressure sensor 82 is large. Meanwhile, when the amount of particulates such as PM deposited is small, the pressure difference between the pressure sensor 81 and the pressure sensor 82 is small.

Figure 3A:
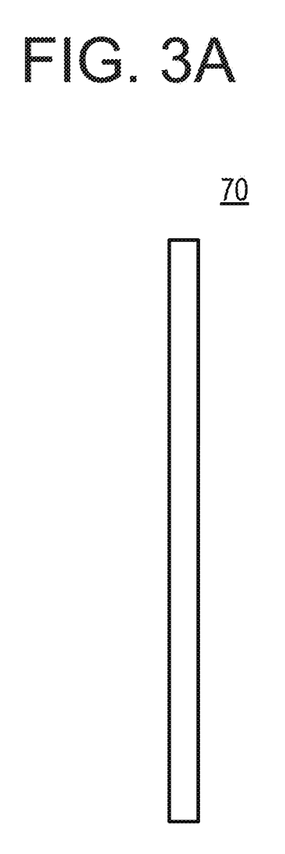
FIGS. 3A and 3B are explanatory views (1) of a rectification unit used in the exhaust purification device according to the first embodiment.
Figure 3B:
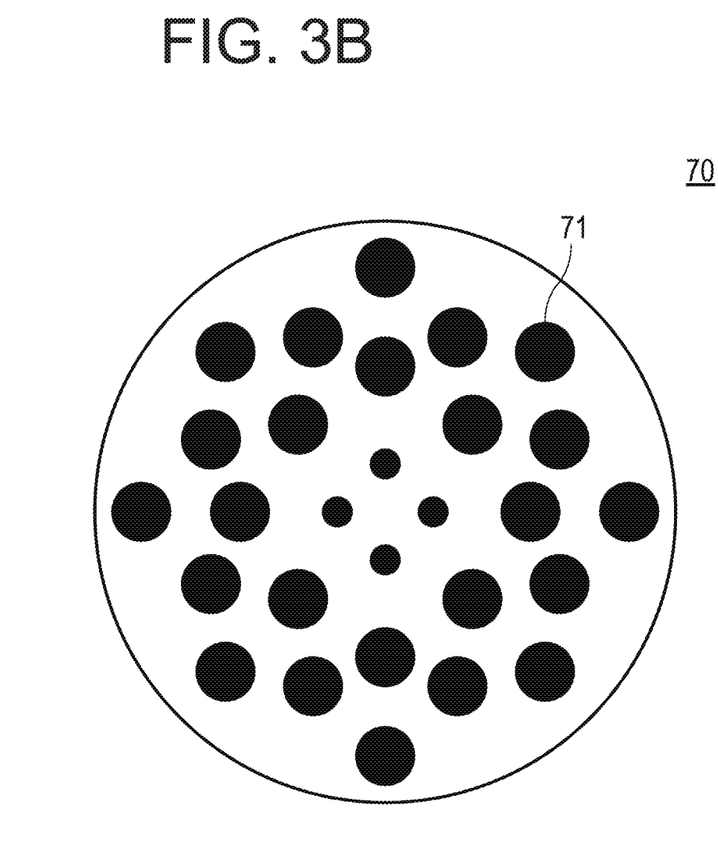

Further, in the present embodiment, in the housing 20, a plate-like rectifier 70 as illustrated in FIGS. 3A and 3B is installed in the front stage of the oxidation catalyst 11. That is, the plate-like rectifier 70 is interposed between the inlet side connection pipe 21 and the oxidation catalyst 11 in the housing 20. FIG. 3A is a side view of the rectifier 70 and FIG. 3B is a front view thereof. The rectifier 70 is made of, for example, cordierite, alumina, titania, or zirconia oxide and has a plurality of holes 71. By installing the rectifier 70 in the front stage of the oxidation catalyst, it is possible to cause, for example, the exhaust gas flowing from the inlet port 20b of the housing 20 to flow evenly throughout the oxidation catalyst 11.

Figure 4A:
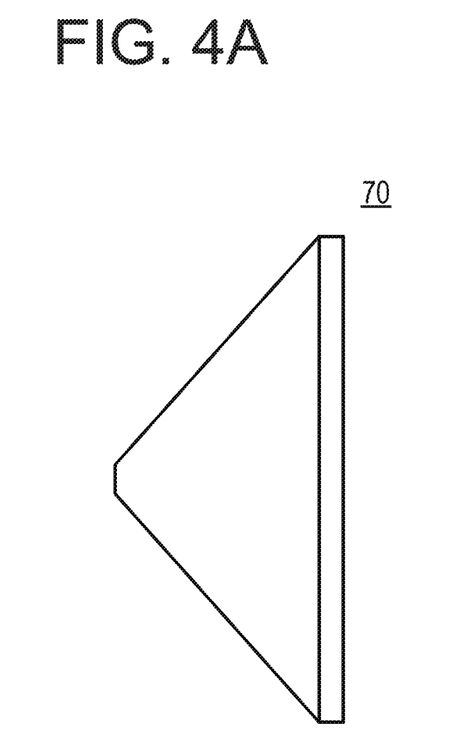
FIGS. 4A and 4B are explanatory views (2) of a rectification unit used in the exhaust purification device according to the first embodiment.
Figure 4B:
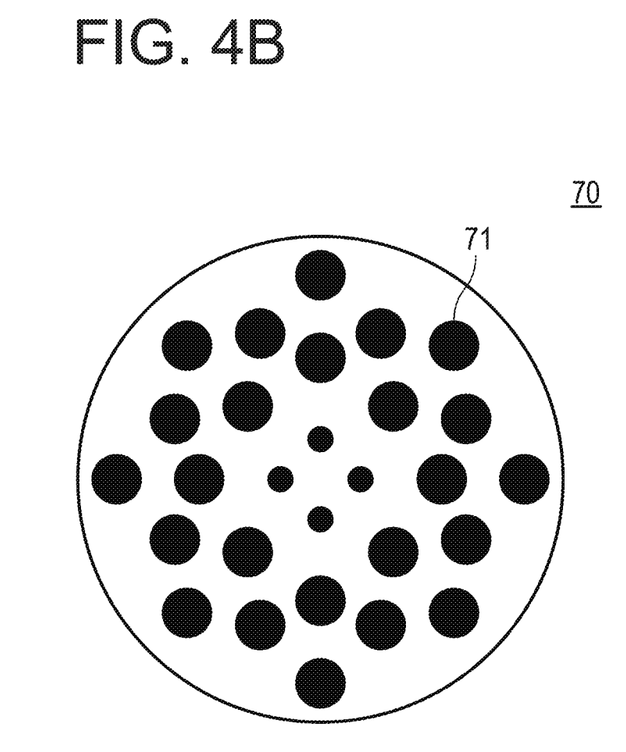

Specifically, for example, the exhaust gas from the engine flows from the inlet side connection pipe 21 into the housing 20, but since the oxidation catalyst 11 installed in the housing 20 has a certain size, the diameter of the inlet port 20b of the housing 20 is widened. Therefore, since the diameter of the inlet side connection pipe 21 and the diameter of the housing 20 are different from each other, for example, the exhaust gas from the engine is likely to flow into the central portion of the oxidation catalyst 11 installed in the housing 20. In the present embodiment, by installing the rectifier 70 at the front stage of the oxidation catalyst 11, it is possible to cause, for example, the exhaust gas flowing from the inlet port 20b to flow evenly throughout the oxidation catalyst 11. Therefore, as illustrated in FIGS. 4A and 4B, it is more preferable that the rectifier 70 has a thick central portion and a thin peripheral portion. FIG. 4A is a side view of the rectifier 70 and FIG. 4B is a front view thereof. Since the rectifier 70 as illustrated in FIGS. 4A and 4B has a longer path length in the central portion than the peripheral portion, for example, the exhaust gas flowing from the inlet port 20b is structurally likely to flow evenly throughout the oxidation catalyst 11. Further, the rectifier unit 70 illustrated in FIGS. 4A and 4B is used for the exhaust purification device 100 illustrated in FIG. 1.

Figure 5:
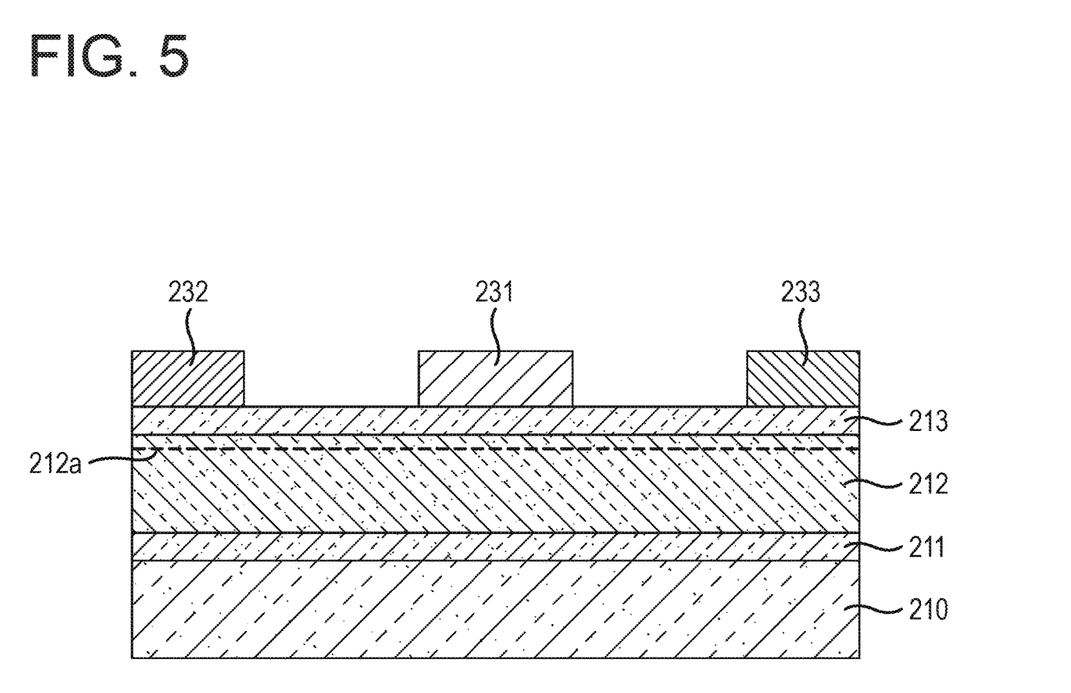
FIG. 5 is a structural view of a semiconductor device used for a microwave generator.

Further, since the microwave generation source in the microwave generator 30 generates a high power microwave, a semiconductor element, specifically, for example, a HEMT using a nitride semiconductor, may be used for the microwave generator 30. As illustrated in FIG. 5, for example, HEMT using a nitride semiconductor is formed by laminating nitride semiconductor layers on a substrate 210 of SiC. That is, a buffer layer 211 formed of, for example, AlN or GaN, an electron transit layer 212, and an electron supply layer 213 are laminated in this order on the substrate 210.

The electron transit layer 212 is formed of GaN, and the electron supply layer 213 is formed of AlGaN or InAlN. As a result, in the electron transit layer 212, 2DEG 212a is generated in the vicinity of the interface with the electron supply layer 213. A gate electrode 231, a source electrode 232, and a drain electrode 233 are formed on the electron supply layer 213.

Figure 6:
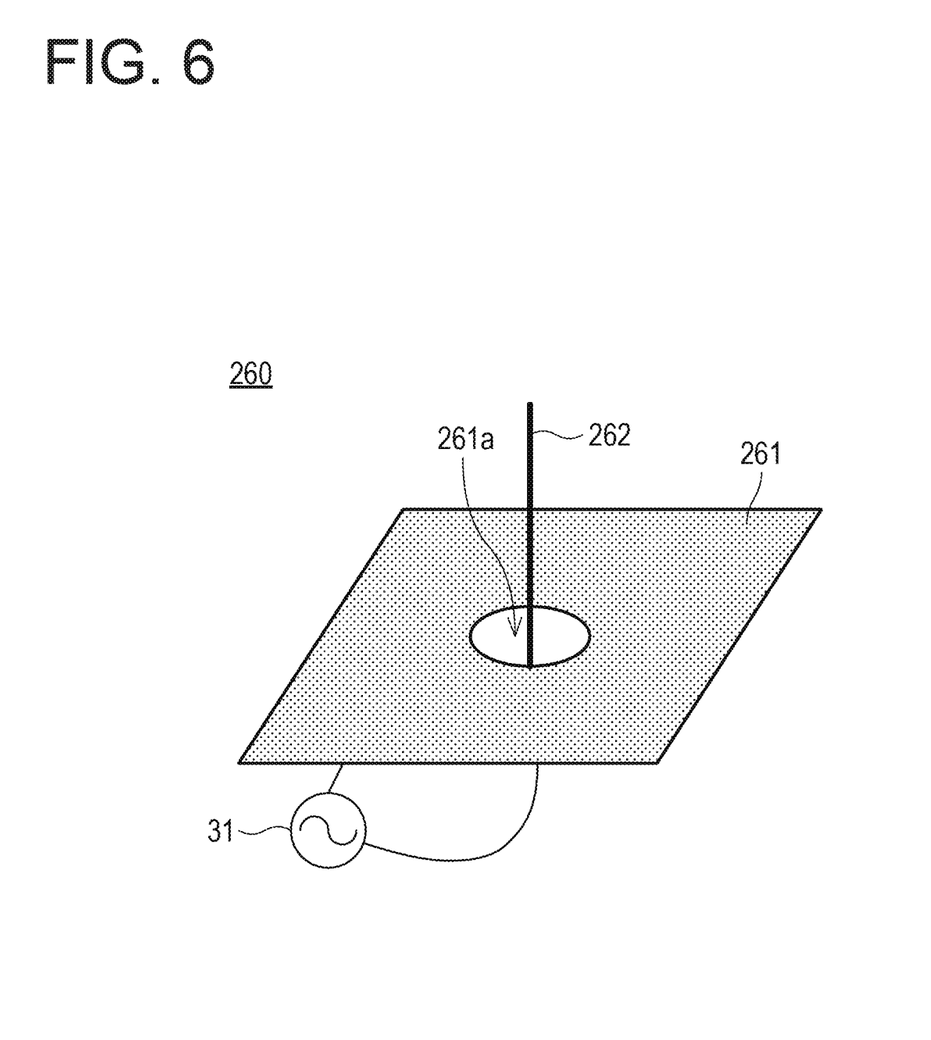
FIG. 6 is an explanatory view of a monopole antenna.
Figures 7A, 7B:
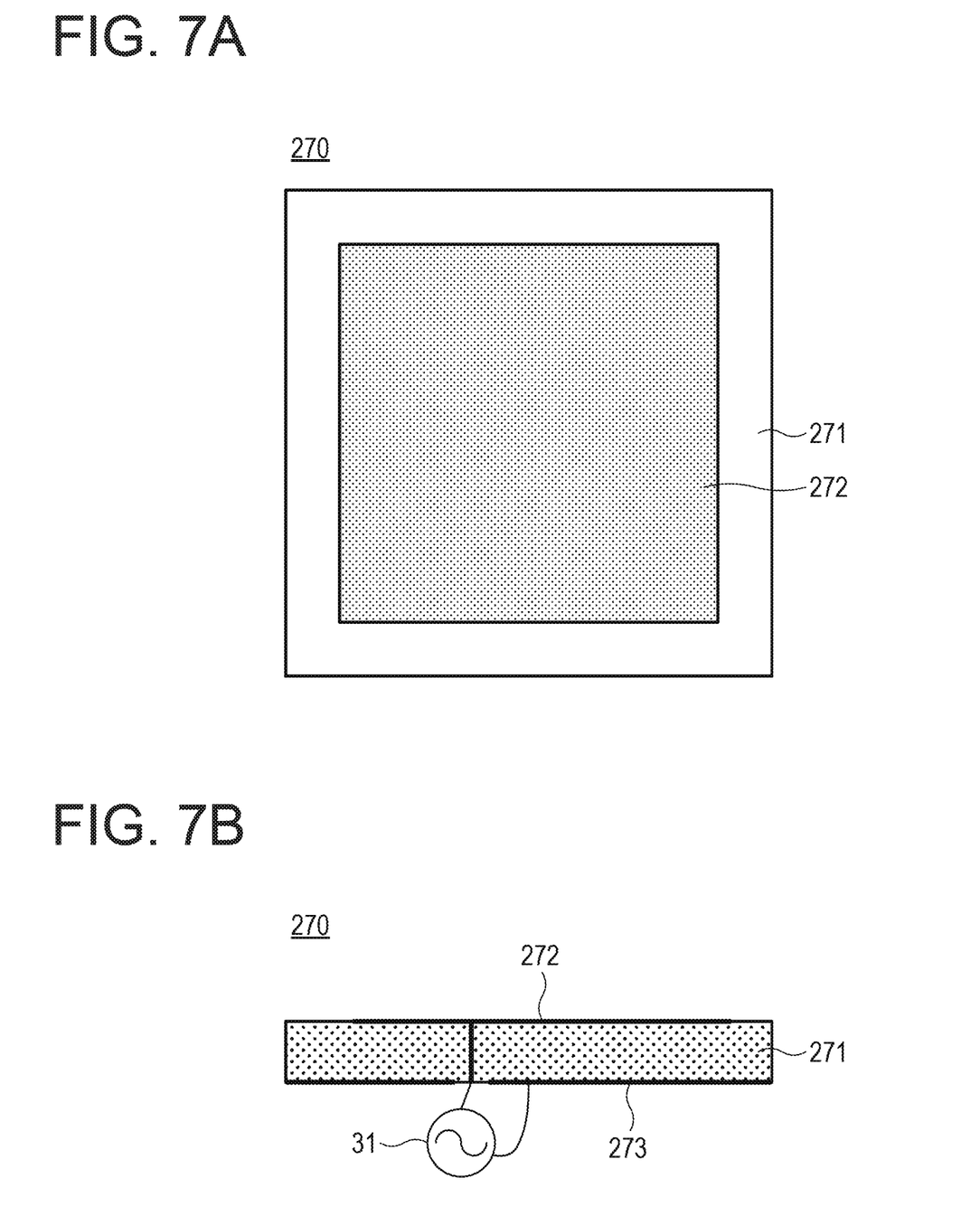
FIGS. 7A and 7B are explanatory views of a patch antenna.

In addition, a monopole antenna 260 as illustrated in FIG. 6 or a planar antenna called a patch antenna 270 as illustrated in FIGS. 7A and 7B is used for the portion of the microwave generator 30 that emits the microwave. Although the exhaust purification device of the present embodiment tends to have a high temperature, these antennas are simple in structure and highly reliable and therefore suitable for long-term use. The monopole antenna 260 illustrated in FIG. 6 has a structure including a ground surface 261 and an antenna portion 262 having a length of ¼ wavelength projected from an opening 261a formed in the center of the ground surface 261, and is connected to the microwave generation source 31 in the microwave generator 30. Further, the patch antenna 270 illustrated in FIGS. 7A and 7B has a structure in which a radiation surface 272 is formed on one surface of a dielectric substrate 271 and a ground surface 273 is formed on the other surface thereof, and is connected to the microwave generation source 31 in the microwave generator 30. The radiation surface 272 of the patch antenna 270 is formed in a substantially square shape having a side length of ½ wavelength. FIG. 7A is a top view of the patch antenna 270 and FIG. 7B is a side view thereof.

[Control 1 of Exhaust Purification Device]

Next, the control of the exhaust purification device according to the present embodiment will be described with reference to FIG. 8. This control is performed by the controller 60.

First, in operation S102, the deposition amount M of particulates such as PM deposited in the particulate filter 10 is measured by the particulate deposition amount measurement circuit 80.

Next, in operation S104, it is determined whether or not the deposition amount M of particulates such as PM deposited in the particulate filter 10, which is measured in operation S102, exceeds a predetermined deposition amount Ma. When it is determined that the deposition amount M exceeds the predetermined deposition amount Ma, the control proceeds to operation S106. When the deposition amount M does not exceed the predetermined deposition amount Ma, the control proceeds to operation S102 and repeats the operation.

In operation S106, a microwave is irradiated from the microwave generator 30 toward the oxidation catalyst 11, and counting of the microwave irradiation time t is started.

Next, in operation S108, it is determined whether or not the microwave irradiation time "t" exceeds the predetermined microwave irradiation time ta. When it is determined that the microwave irradiation time "t" exceeds the predetermined microwave irradiation time ta, the control proceeds to operation S110. When it is determined that the microwave irradiation time "t" does not exceed the predetermined microwave irradiation time ta, the control repeats operation S108.

In operation S110, the generation of the microwave in the microwave generator 30 is stopped, and then, the control proceeds to operation S102.

Figure 8:
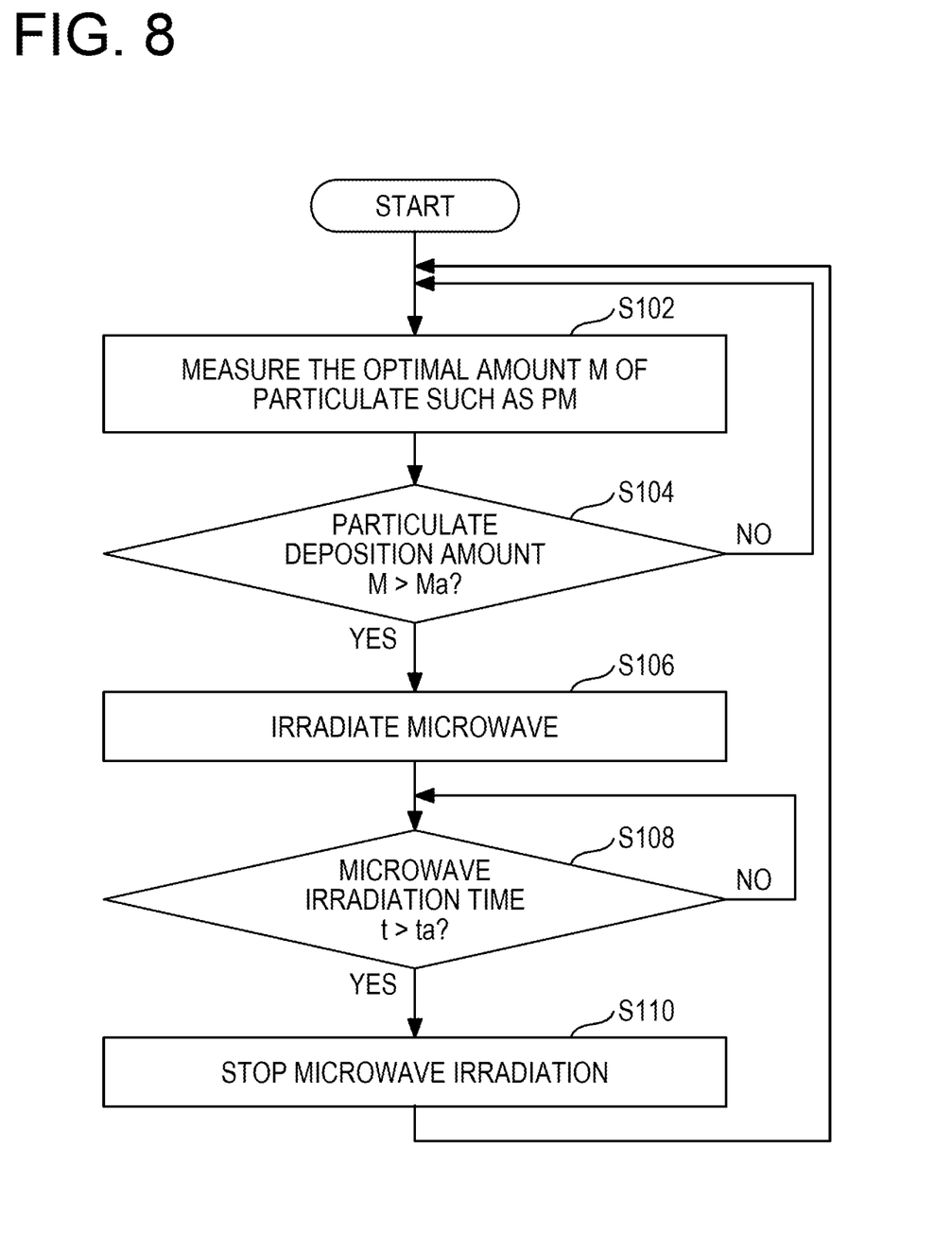
FIG. 8 is a flowchart of a control method of the exhaust purification device according to the first embodiment.

Through the above operations, the control of the exhaust purification device illustrated in FIG. 8 is performed.

[Control 2 of Exhaust Purification Device]

Next, another control of the exhaust purification device according to the present embodiment will be described with reference to FIG. 9. Another control of the exhaust purification device according to the present embodiment is performed by the controller 60.

First, in operation S202, the temperature T of the oxidation catalyst 11 is measured by the thermometer 50.

Next, in operation S204, it is determined whether or not the temperature T of the oxidation catalyst 11 measured in operation S202 is less than a predetermined temperature Ta. The predetermined temperature Ta is a temperature at which the catalyst in the oxidation catalyst 11 is sufficiently activated. When it is determined that the temperature T is less than the predetermined temperature Ta, the control proceeds to operation 206. When it is determined that the temperature T is not less than the predetermined temperature Ta, the control proceeds to operation S202.

In operation S206, microwave irradiation from the microwave generator 30 toward the oxidation catalyst 11 is started.

Next, in operation S208, the temperature T of the oxidation catalyst 11 is measured again by the thermometer 50.

Next, in operation S210, it is determined whether or not the temperature T of the oxidation catalyst 11 measured in operation S208 is equal to or higher than the predetermined temperature Ta. When it is determined that the temperature T is equal to or higher than the predetermined temperature Ta, the control proceeds to operation S212. When it is determined that the temperature T is not equal to or higher than the predetermined temperature Ta, the control proceeds to operation S208.

In operation S212, the generation of the microwave in the microwave generator 30 is stopped, and then, the control proceeds to operation S202.

Figure 9:
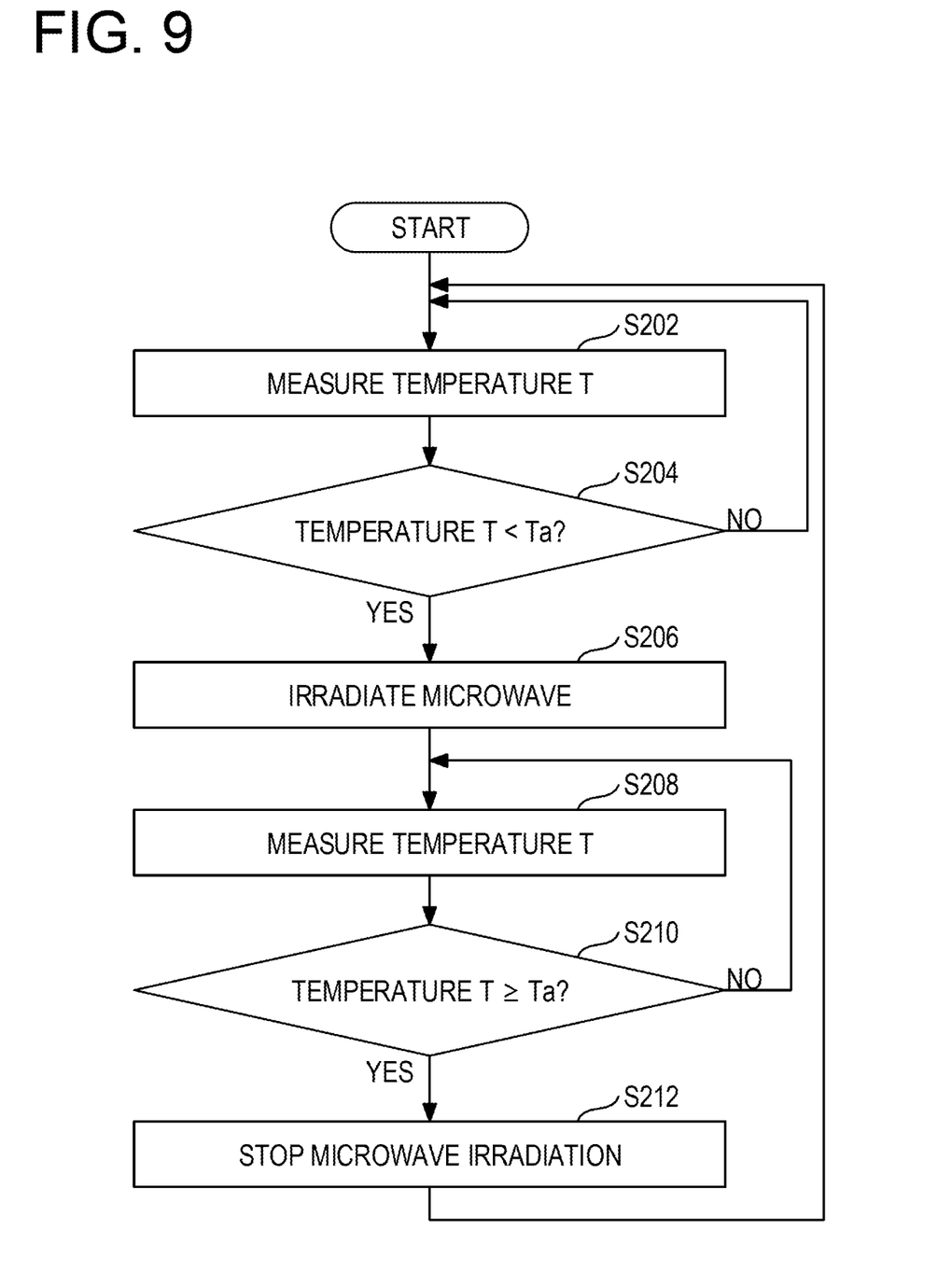
FIG. 9 is a flowchart of another control method of the exhaust purification device according to the first embodiment.

Through the above operations, the control of the exhaust purification device illustrated in FIG. 9 is performed.

Second Embodiment

Next, a second embodiment will be described. The second embodiment is, for example, an internal combustion device, a power generation device, or an automobile using the exhaust purification device 100 according to the first embodiment.

Figure 10:
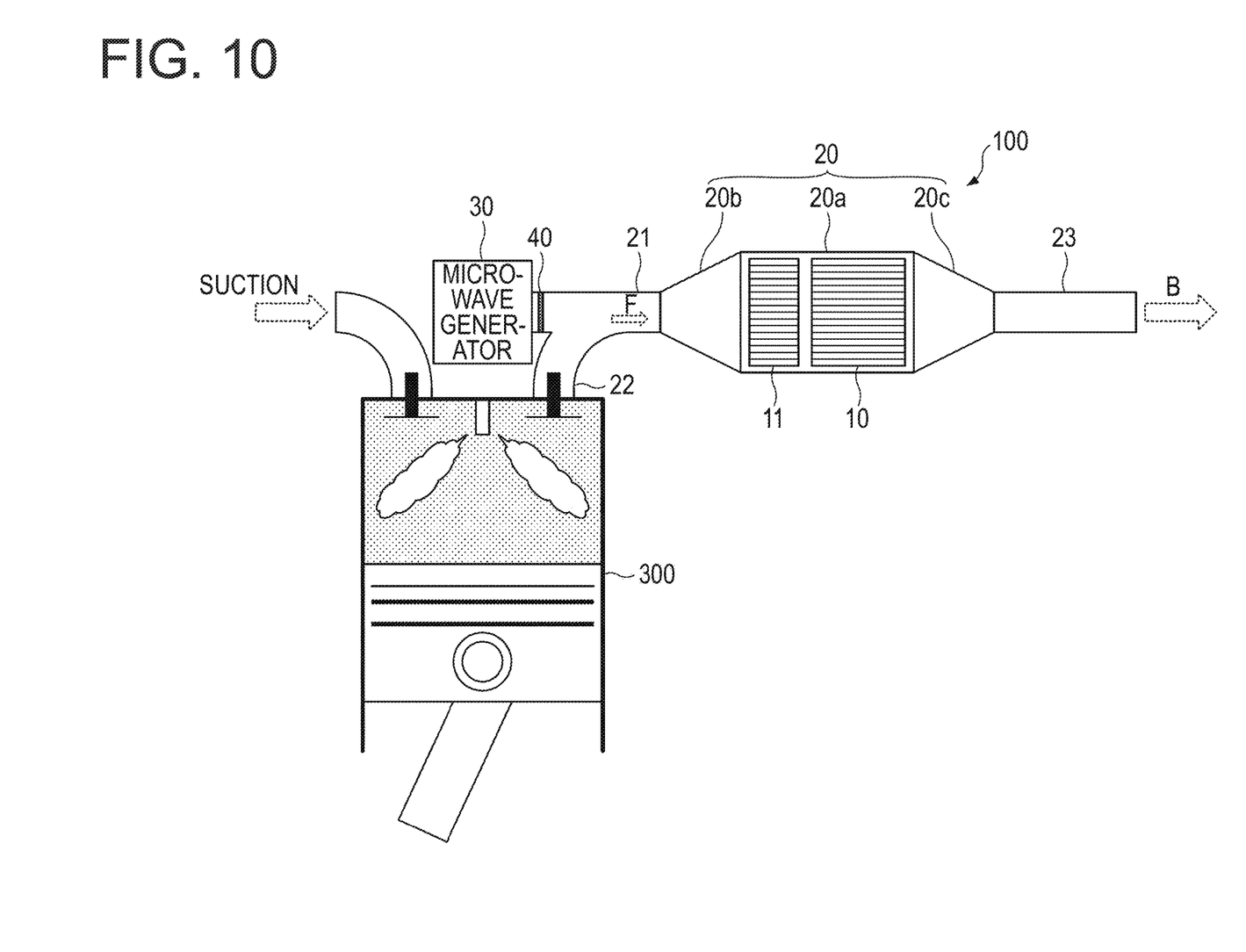
FIG. 10 is an explanatory view of an internal combustion device according to a second embodiment.

FIG. 10 illustrates an internal combustion device according to the present embodiment. In this internal combustion device, the suction pipe 22 is connected to an exhaust port of an engine 300 such as a diesel engine which is an internal combustion device. An exhaust gas of the engine 300 flows from the suction pipe 22 and flows into the housing 20 of the exhaust purification device 100 as indicated by a broken line arrow F, so as to be purified and discharged.

Figure 11:
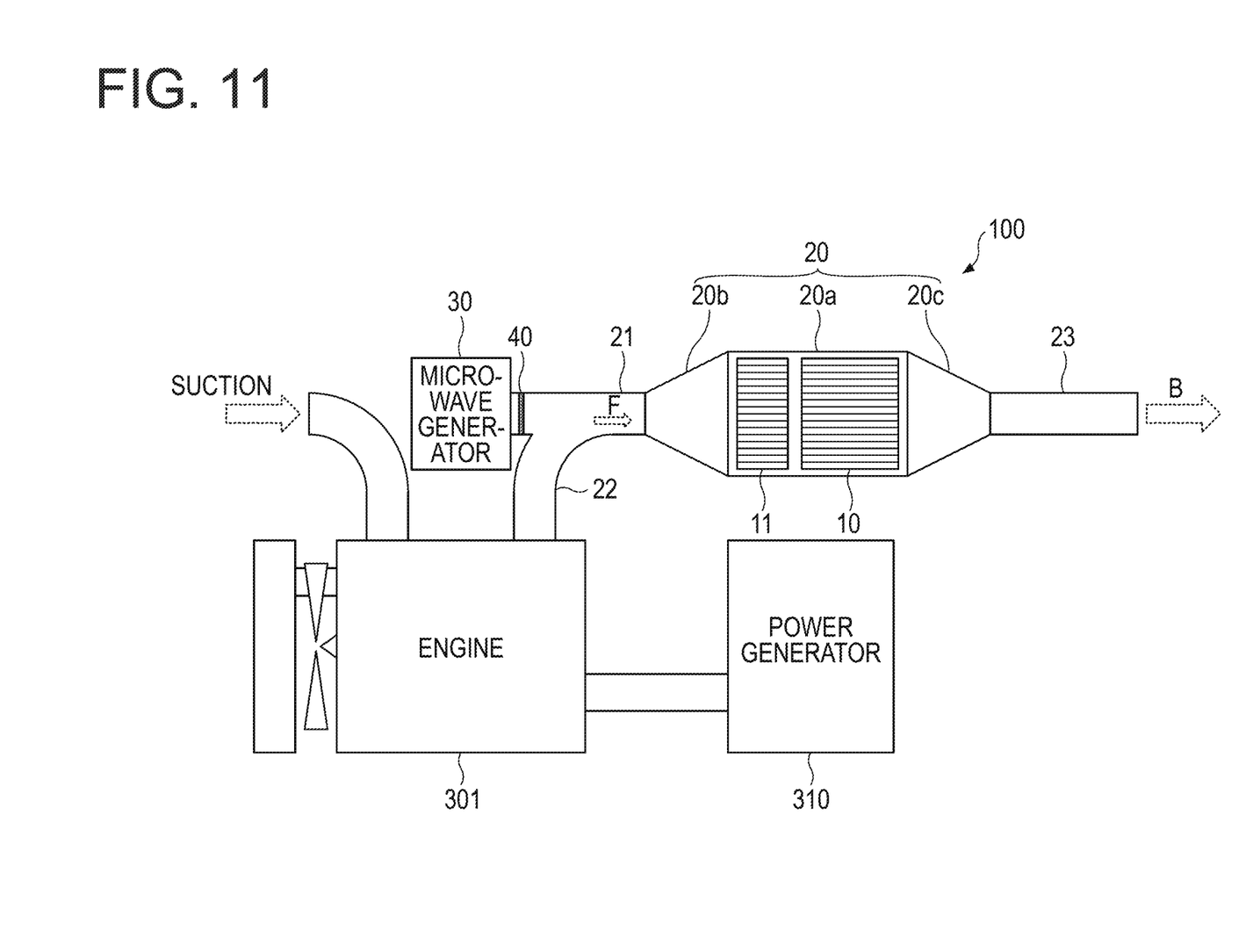
FIG. 11 is an explanatory view of a power generation device according to the second embodiment.

FIG. 11 illustrates a power generation device according to the present embodiment. In this power generation device, a power generator 310 is connected to an engine 301 such as a diesel engine, which is an internal combustion device, and it is possible to generate power by turning the power generator 310 with a force generated in the engine 301. The suction pipe 22 is connected to an exhaust port of the engine 301 such as a diesel engine, and an exhaust gas of the engine 301 flows from the suction pipe 22 and flows into the housing 20 of the exhaust purification device 100 as indicated by a broken line arrow F, so as to be purified and discharged.

Figure 12:
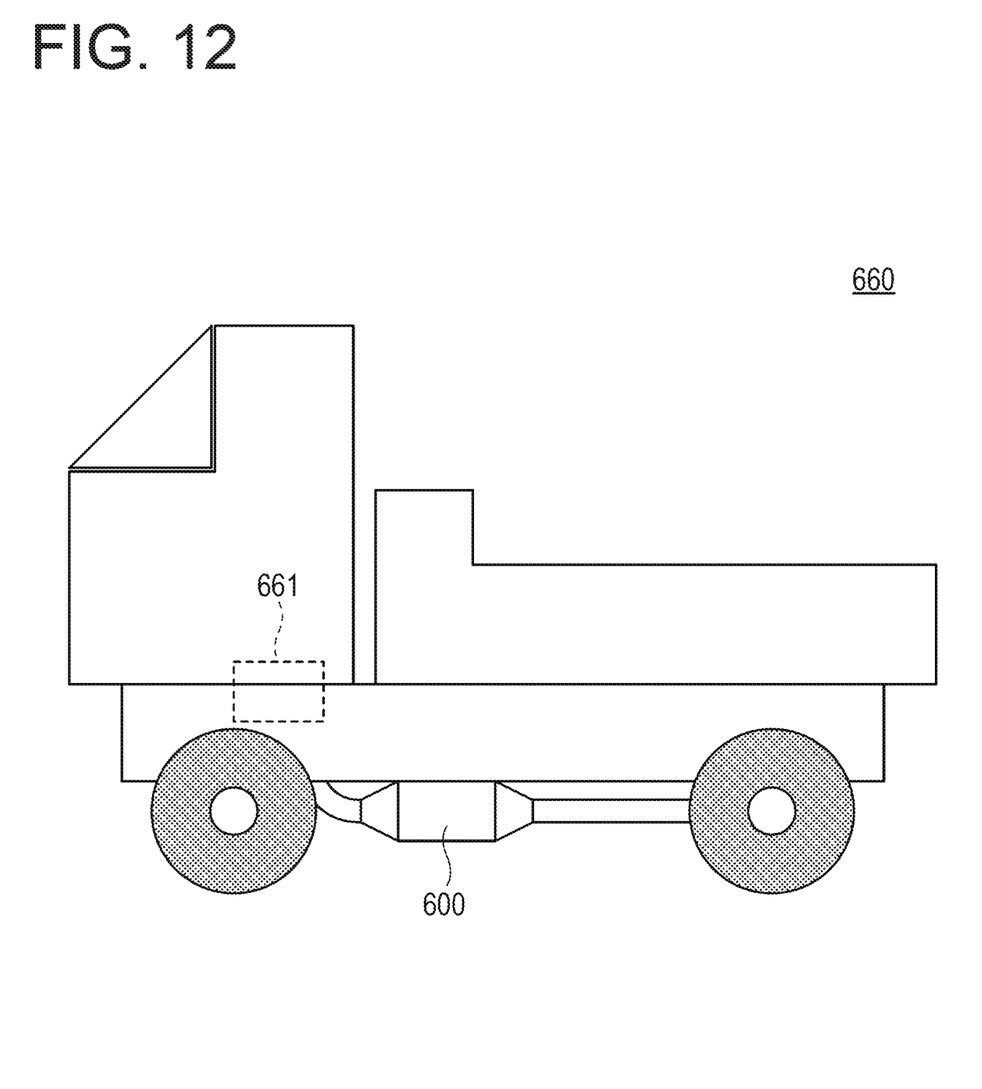
FIG. 12 is an explanatory view of an automobile according to the second embodiment.

FIG. 12 illustrates an automobile 660 according to the present embodiment, to which the exhaust purification device 100 according to the first embodiment is attached. In the automobile 660 of the present embodiment, an exhaust gas generated in an engine 661 such as a diesel engine of the automobile 660 may be purified by the exhaust gas purification device 100.

In addition, the exhaust purification device 100 according to the first embodiment may also be applied to, for example, a ship, an agricultural machine, and an apparatus having a diesel engine.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An exhaust purification device comprising:
    a particulate filter configured to collect particulates contained in an exhaust gas;
    an oxidation catalyst disposed in a front stage of the particulate filter and configured to have a carrier partially or entirely made of a material which absorbs a microwave;
    a housing in which the particulate filter and the oxidation catalyst are arranged; and
    a microwave generator configured to generate a microwave to be irradiated onto the oxidation catalyst in a direction to which the exhaust gas flows.

2. The exhaust purification device according to claim 1, wherein the material that absorbs the microwave contains silicon carbide (SiC) or foamed metal.

3. The exhaust purification device according to claim 1, wherein the microwave generator is arranged linearly with the oxidation catalyst and the particulate filter assembled in the housing.

4. The exhaust purification device according to claim 1, wherein the housing includes a housing body covering the particulate filter and the oxidation catalyst, and an inlet port and an outlet port of the exhaust gas connected to the housing body,
    wherein a connection pipe is interposed between the inlet port and the microwave generator, and wherein a suction pipe into which the exhaust gas is sucked is connected to the connection pipe.

5. The exhaust purification device according to claim 4, wherein a microwave transmission plate is interposed between a connecting portion of the connection pipe and the suction pipe and the microwave generator.

6. The exhaust purification device according to claim 4, wherein a rectifier having a hole for rectifying a flow of the exhaust gas sucked from the suction pipe is interposed between the connection pipe and the oxidation catalyst, in the housing.

7. The exhaust purification device according to claim 6, wherein the rectifier is thicker in a central portion than a peripheral portion.

8. The exhaust purification device according to claim 1, wherein the microwave generator includes a monopole antenna or a planar antenna.

9. The exhaust purification device according to claim 1, further comprising:
a controller configured to control the microwave generator to irradiate the microwave toward the oxidation catalyst when the particulates deposited in the particulate filter exceeds a predetermined amount.

10. The exhaust purification device according to claim 1, further comprising:
a thermometer configured to measure a temperature of the oxidation catalyst; and
a controller configured to control the microwave generator to irradiate the microwave toward the oxidation catalyst when the temperature measured by the thermometer is lower than a predetermined temperature.

11. An internal combustion device comprising:
an engine; and
an exhaust purification device coupled to the engine, the exhaust purification device including:
a particulate filter configured to collect particulates contained in an exhaust gas,
an oxidation catalyst disposed in a front stage of the particulate filter and configured to have a carrier partially or entirely made of a material which absorbs a microwave,
a housing in which the particulate filter and the oxidation catalyst are arranged, and
a microwave generator configured to generate a microwave to be irradiated onto the oxidation catalyst in a direction to which the exhaust gas flows.

12. A power generation device comprising:
an engine;
a power generator coupled to the engine; and
an exhaust purification device coupled to the engine, the exhaust purification device including:
a particulate filter configured to collect particulates contained in an exhaust gas,
an oxidation catalyst disposed in a front stage of the particulate filter and configured to have a carrier partially or entirely made of a material which absorbs a microwave,
a housing in which the particulate filter and the oxidation catalyst are arranged, and
a microwave generator configured to generate a microwave to be irradiated onto the oxidation catalyst in a direction to which the exhaust gas flows.

13. The power generation device according to claim 12, wherein the power generation device is used by an automobile.

* * * * *